(12) United States Patent
Harwood

(10) Patent No.: US 8,070,310 B2
(45) Date of Patent: Dec. 6, 2011

(54) WINDOW LIGHTING SYSTEM

(76) Inventor: Ronald Paul Harwood, Farmington Hills, MI (US)

( * ) Notice: Subject to any disclaimer, the term of this patent is extended or adjusted under 35 U.S.C. 154(b) by 348 days.

(21) Appl. No.: 12/372,811

(22) Filed: Feb. 18, 2009

(65) Prior Publication Data

US 2010/0207542 A1    Aug. 19, 2010

(51) Int. Cl.
*F21V 33/00* (2006.01)
*E04H 1/00* (2006.01)
*F21V 1/00* (2006.01)

(52) U.S. Cl. ........... 362/147; 362/125; 362/145; 52/235
(58) Field of Classification Search .................. 362/125, 362/145, 147; 52/235
See application file for complete search history.

(56) References Cited

U.S. PATENT DOCUMENTS

| | | | |
|---|---|---|---|
| 4,164,010 A | | 8/1979 | Finch |
| 5,253,459 A | * | 10/1993 | Parinas et al. .................. 52/235 |
| 5,895,111 A | | 4/1999 | Santosuosso et al. |
| 5,900,850 A | * | 5/1999 | Bailey et al. .................. 345/55 |
| 5,988,831 A | | 11/1999 | Pan |
| 6,065,854 A | | 5/2000 | West et al. |
| 6,237,290 B1 | | 5/2001 | Tokimoto et al. |
| 6,968,658 B2 | | 11/2005 | Hales |
| 6,993,873 B2 | | 2/2006 | Biebuyck et al. |
| 7,000,355 B2 | | 2/2006 | Flory et al. |
| 7,111,433 B2 | | 9/2006 | Kerscher |
| 7,170,751 B2 | | 1/2007 | Mayer |
| 2005/0265019 A1 | | 12/2005 | Sommers et al. |
| 2008/0037239 A1 | | 2/2008 | Thomas et al. |
| 2008/0158858 A1 | | 7/2008 | Madireddi et al. |
| 2008/0198584 A1 | * | 8/2008 | Fouraux et al. ............... 362/147 |
| 2008/0211428 A1 | | 9/2008 | Bayat et al. |
| 2008/0219002 A1 | | 9/2008 | Sommers et al. |

FOREIGN PATENT DOCUMENTS

WO    9906759 A1    11/1999

OTHER PUBLICATIONS

International Search Report and Written Opinion for corresponding Application No. PCT/US2010/021006, mailed Mar. 19, 2010, 12 pages.

* cited by examiner

*Primary Examiner* — Stephen F Husar
*Assistant Examiner* — James Cranson, Jr.
(74) *Attorney, Agent, or Firm* — Brooks Kushman P.C.

(57) ABSTRACT

A window lighting system for a building structure curtain wall is provided with a housing sized to be received upon a structural member, with an opening facing the window. A refracting lens is mounted adjacent the opening. A plurality of longitudinally spaced discrete light sources are positioned in the housing, each oriented towards the refracting lens such that the light is conveyed to the refracting lens and subsequently out of the housing opening for illuminating the window. A lighting system is provided with the housing sized to extend along the window upon a cover of a structural member between a pair of sequential structure members. A lighting system cover is supported by the housing for concealing the light source and providing an ornamental appearance similar to that of the cover of the underlying structural member without obfuscating an ornamental appearance of the window and the structure members.

26 Claims, 3 Drawing Sheets

WINDOW LIGHTING SYSTEM

BACKGROUND

1. Technical Field

Embodiments of the invention relate to window lighting systems for a building structure curtain wall.

2. Background Art

The prior art has provided building structures with curtain walls having a significant exterior of the curtain wall covered by windows. Often, the windows of the curtain wall are illuminated by exterior spot lamps, or by lighting that is directed from the interior of the building.

The curtain wall often includes perimeter structure members, such as mullions and transoms for supporting the windows. Often, covers are provided over the mullions and transoms to provide a uniform ornamental appearance to the interior of the building structure.

SUMMARY

One embodiment provides a lighting system for a building structure curtain wall having a plurality of perimeter structure members to secure a window. The lighting system includes a housing that is sized to be received upon a first perimeter structure member between a pair of sequential perimeter structure members that are each nonparallel with the first perimeter structure member such that the housing extends adjacent to the window. The housing includes an opening for facing the window. A refracting lens is mounted to the housing adjacent to the housing opening. A plurality of longitudinally spaced discrete light sources are positioned within the housing, each oriented towards the refracting lens such that light from the plurality of light sources is conveyed to the refracting lens and subsequently out of the housing opening for illuminating the window.

Another embodiment provides a lighting system for a building structure curtain wall having a plurality of perimeter structure members to secure a window. The lighting system includes a housing sized to extend along the window upon a cover of a first perimeter structure member between a pair of sequential perimeter structure members that are nonparallel with the first perimeter structure member. The housing has an opening for facing the window. A light source is positioned within the housing such that light from the light source is conveyed out of the housing opening for illuminating the window. A lighting system cover is supported by the housing for concealing the light source and providing an ornamental appearance similar to that of the cover of the underlying first perimeter structure member without obfuscating an ornamental appearance of the window and the perimeter structure members.

Yet another embodiment provides a lighting system for a building structure curtain wall having a plurality of perimeter structure members to secure a window. The lighting system has a housing sized to extend along the window upon a first perimeter structure member between a pair of sequential perimeter structure members that are nonparallel with the first perimeter structure member. The housing has an opening for facing the window. A light source is positioned within the housing such that light from the light source is conveyed out of the housing opening for illuminating the window. A cover is supported by the housing for concealing the light source and the first perimeter structure member of the curtain wall without obfuscating an ornamental appearance of the window and the perimeter structure members.

Another embodiment provides a method for installing a lighting system to a building structure curtain wall having a plurality of perimeter structure members to secure a window. A housing is provided that is sized to extend between a pair of sequential perimeter structure members adjacent the window with an opening in the housing. The housing is installed upon a perimeter structure member that is nonparallel with the pair of sequential perimeter structure members. A light source is installed within the housing such that light from the light source is conveyed out of the housing opening for illuminating the window. A lighting system cover is provided that is sized and shaped to provide the appearance of a transom cover. The lighting system cover is installed over the housing.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
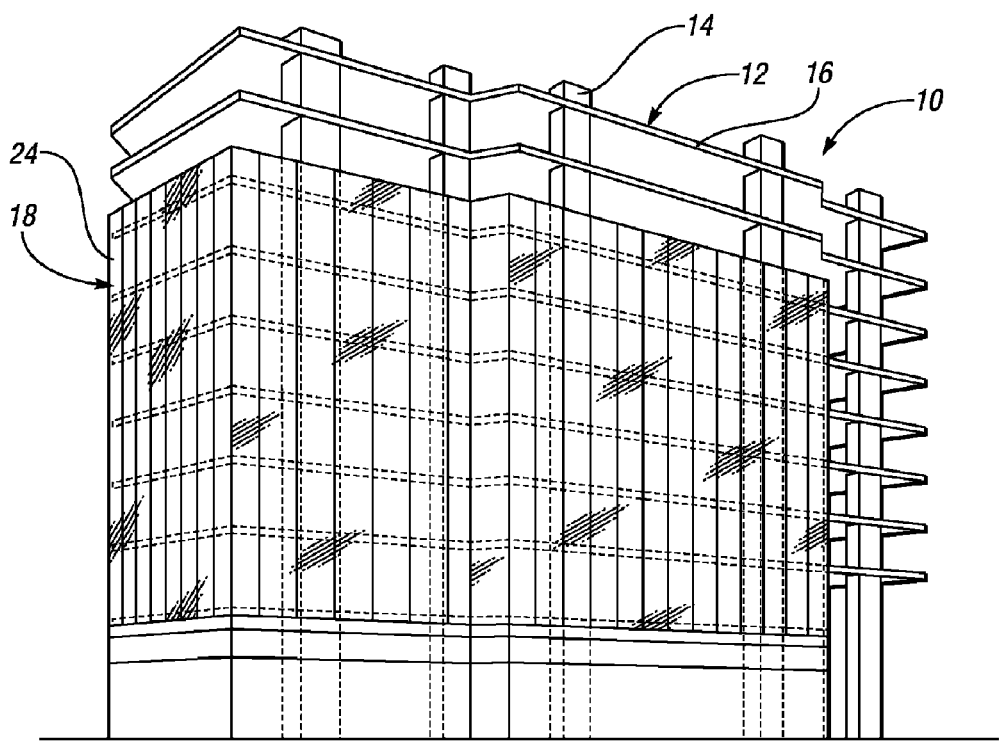
FIG. 1 is a fragmentary perspective view of a building structure having a curtain wall according to an embodiment.

Referring now to FIG. 1, a building 10 is illustrated with a building structure 12. The building structure 12 includes a series of columns 14 for supporting a series of floor plates 16. The floor plates 16 each support the deadload of a corresponding floor or story of the building 10. The deadload supported by each floor plate 16 is distributed to the columns 14.

A curtain wall 18 is provided about the building structure 12. The curtain wall 18 provides a building facade which does not support any deadload. The curtain wall 18 is connected to the plates 16 and columns 14 of the building structure 12.

Figure 2:
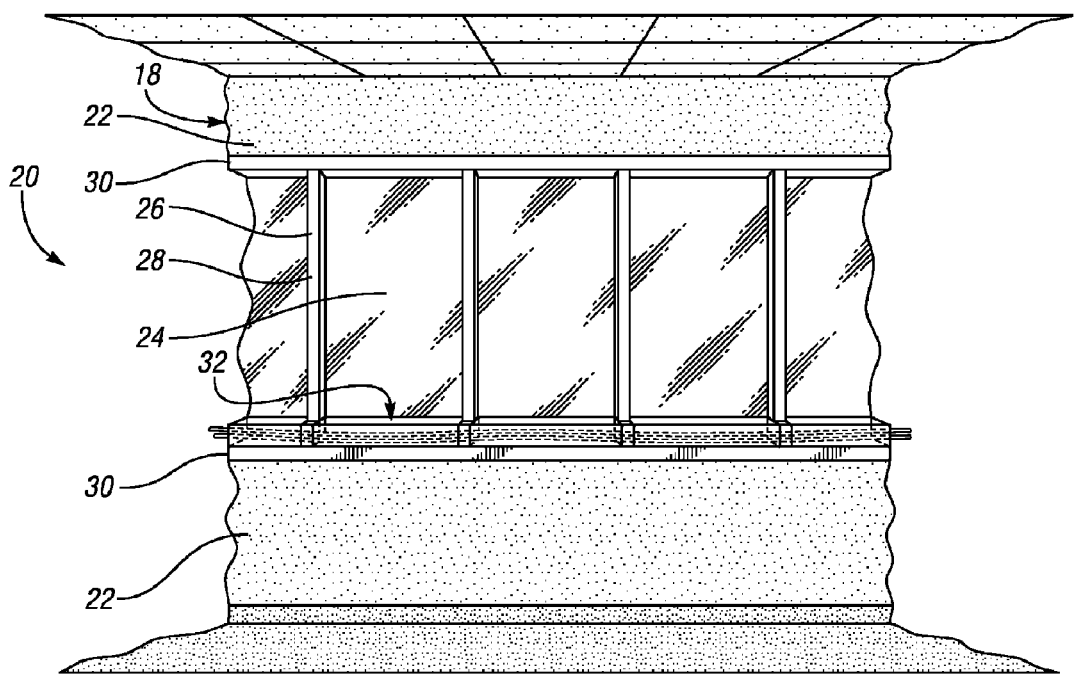
FIG. 2 is an internal perspective view of the curtain wall of FIG. 1, illustrated with a window laying system according to an embodiment of the present invention.

Referring now to FIG. 2, an interior region 20 of the building 10 is illustrated. An interior side of the curtain wall 18 is also illustrated. The curtain wall 18 includes a series of horizontal perimeter structure members 22, which may be transoms, lentils, beams or the like for providing a perimeter about a window 24 or series of windows 24. The curtain wall 18 also includes a series of vertical perimeter structure members 26, which each extend between a pair of horizontal structure members 22 and provide a perimeter for each window 24. The vertical structure members 26 may be mullions or the like. The mullions 26 depicted in FIG. 2 may provide an exterior ornamental appearance alone, or may be provided with a cover 28 for providing the exterior ornamental appearance. Likewise, a pair of transom covers 30 may be provided for covering the horizontal structure members 22 to provide a uniform exterior ornamental appearance.

A lighting system 32 is provided upon the transom cover 30. The lighting system 32 is utilized for illuminating the windows 24 for providing an illuminated effect to the windows 24 when viewed externally. Thus, the windows 24 can be illuminated without applying external spot lamps that unevenly illuminate the exterior of the building 10. Additionally, the lighting system 32 may be employed for illuminating the windows 24 internally without requiring operation of other lighting systems that are utilized for illuminating the interior region 20, and consequently require a substantially larger amount of power than the lighting system 32.

Additionally, the lighting system 32 is sized to provide an ornamental appearance corresponding to that of the transom cover 30 so that an ornamental appearance of the windows 24 and corresponding mullion and transom covers 28, 30 is not obfuscated, and is generally maintained even with the employment of the lighting system 32. Thus, the lighting system 32 provides illumination advantages over the prior art, yet is concealed within an interior of the building 10.

The lighting system 32 is not accessible external of the building 10 thereby avoiding exposure to the elements. For example, the lighting system 32 does not require environmental protection, because protection is provided by the existing windows 24. Outdoor lighting would require protection from water, ultraviolet light, extreme heat, extreme cold and the like. Such protection is provided by the windows 24 and therefore is not required by the lighting system 32. Additionally, the lighting system 32 is provided internally within the building 10 and takes advantage of existing heating, ventilation and air-conditioning (HVAC) of the building 10. In contrast, prior art lighting systems that are provided external of buildings may require HVAC built into the system in order prevent overheating.

Placement of the lighting system 32 within the building 10 prevents potential vandalism in comparison to prior art lighting systems that are not protected by the building 10. To prevent vandalism from within the building 10, the lighting system 32 can be assembled with fasteners that require security tools.

Maintenance costs are reduced by placement of the lighting system 32 within the interior region 20. Prior art lighting systems require additional maintenance due to environmental exposure. Additionally, the lighting system 32 is easier to maintain because it is accessible internally. In contrast, prior art lighting systems that are mounted to an exterior of a building require great care and expense in accessing and handling during maintenance and repair. Further, the windows 24 of the building 10, can be washed, maintained, or repaired externally without an external lighting system as an obstacle.

The concealed lighting system 32 is provided internally within the building structure 12 without disrupting an internal ornamental appearance and without significant obstruction to the view through the windows 24. For example the lighting system may be painted, laminated, or the like to match existing perimeter structure covers 28, 30, base molding, furniture or the like. Although the lighting system 32 is illustrated extending across a plurality of mullions 26, the invention contemplates that the lighting system 32 can be provided individually between a pair of mullions 26. Additionally, the invention contemplates utilization of the lighting system 32 along any perimeter structure member regardless of orientation. Thus, the lighting system 32 may be employed horizontally, vertically, or along any angle or contour as dictated by window arrangement and lighting design of the particular building.

Figure 3:
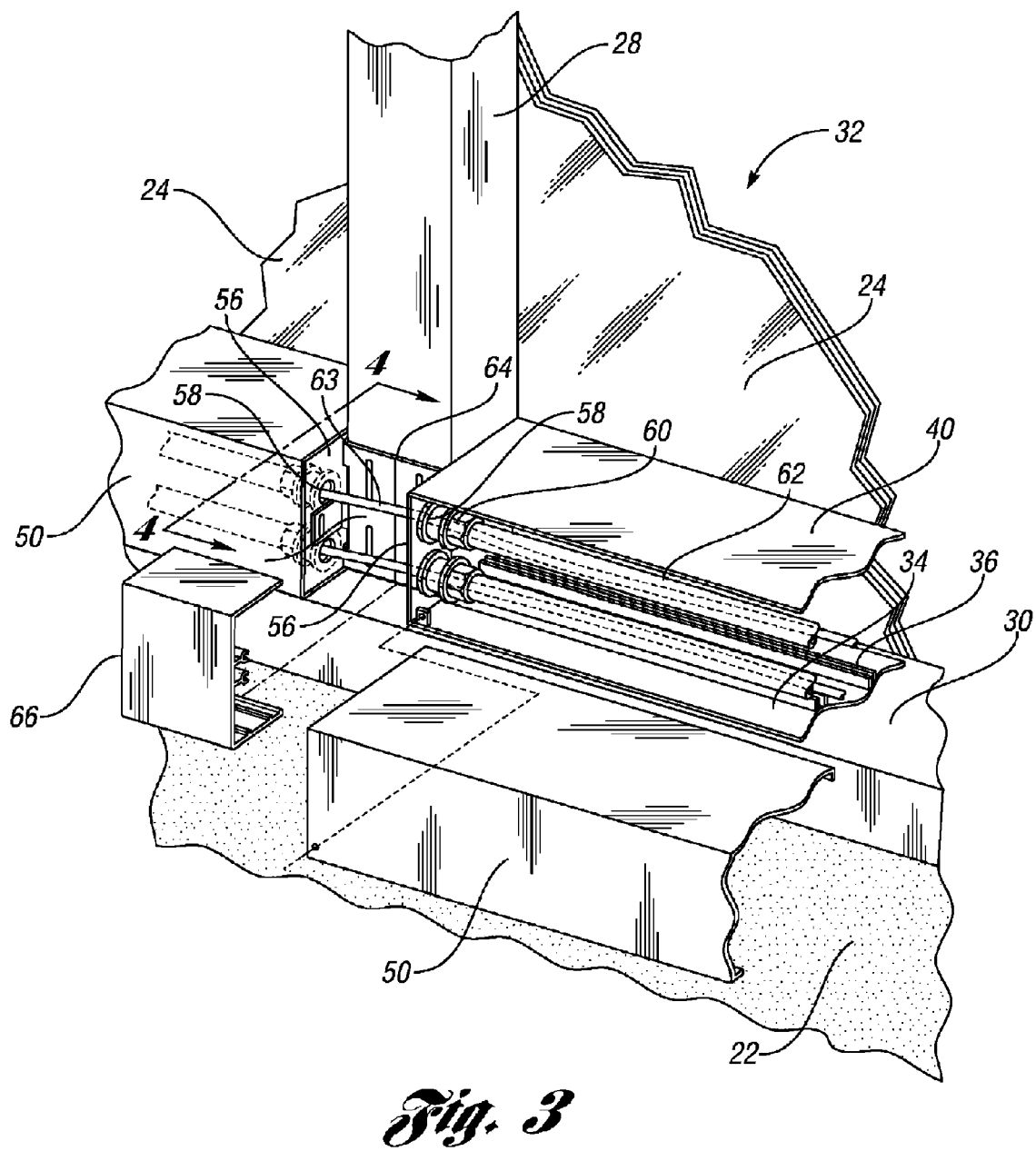
FIG. 3 is an enlarged partially exploded view of the window lighting system of FIG. 2.
Figure 4:
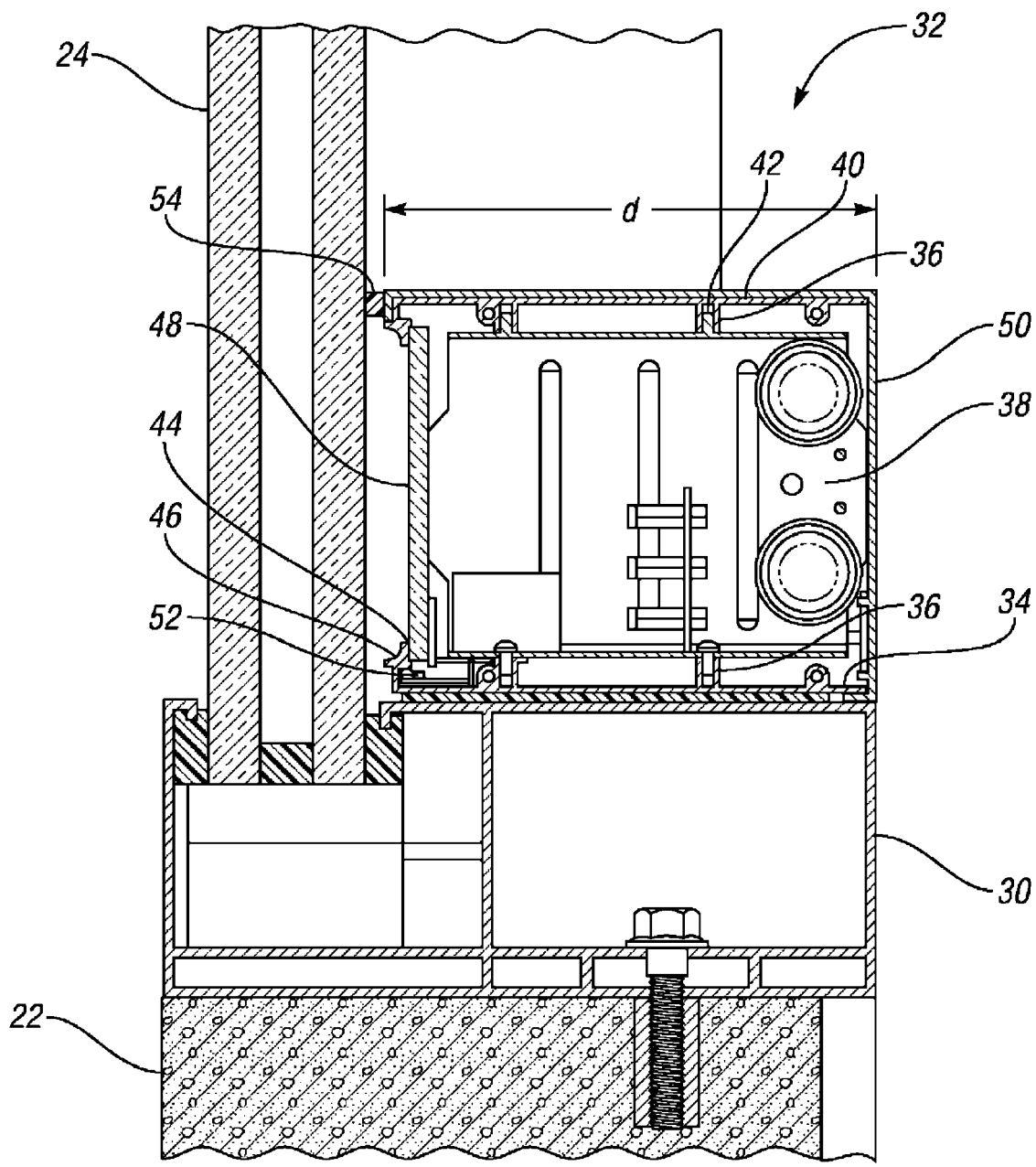
FIG. 4 is a partial section view of the window lighting system of FIG. 3.

Referring now to FIGS. 3 and 4. The lighting system 32 is illustrated in greater detail. The lighting system 32 includes a series of bases 34 that are each sized to extend along the window 24 upon the transom cover 30. The bases 34 each have a length that is sized to extend between a pair of sequential mullion covers 28. The base 34 has a series of tracks 36 formed therein. The base 34 may be formed unitarily with tracks 36, and the base 34 may be formed from extruded aluminum, or the like. Referring specifically to FIG. 4, a structural plate 38 is illustrated, received within the tracks 36 and extending upright. The structural plate 38 acts as a web for providing vertical support for the lighting system 32. Although one structural plate 38 is illustrated in FIG. 4, the structural plates 38 may be provided incrementally along the length of the base 34 as required by the particular support requirements of the lighting system 32.

An upper flange 40 is provided supported upon the structural plates 38. The upper flange 40 has a series of tracks 36 for being supported on corresponding projections 42 of the structural plate 38. The upper flange 40 may have a common cross section with the base 34 for simplifying the manufacturing and part count of the lighting system 32. The base 34, structural plates 38 and upper flange 40 collectively provide a housing (34, 38, 40) for each window increment of the lighting system 32.

Referring to FIG. 4, the base 34 and the flange 40 collectively provide an opening 44 in the housing (34, 38, 40). Specifically, the base 34 and the upper flange 40 each include an inwardly extending shoulder 46 for receiving a lens 48. The plates 38 engage an inward side of the lens 48 maintaining the lens 48 in alignment with the shoulders 46. A lighting system cover 50 is mounted to the upper flange 40 and the base 34 for enclosing the housing (34, 38, 40) and concealing the lighting system 32 so that light from the lighting system 32 exits the opening 44 only. The lighting cover 50 has a depth, d, in a direction that is generally perpendicular to the window 24. The depth is sized to match that of the transom cover 30 for providing an ornamental appearance that is similar to that of the transom cover 30 without obfuscating an ornamental appearance of the window 24, the corresponding structure members 22, 26 and the mullion and transom covers 28, 30. As discussed above, the lighting cover can be painted, laminated, or the like to provide the desired ornamental appearance. Further the lighting cover 50 may be fastened with minimal tools, or toolless, in order to maximize ease in assembly and installation.

A light source is provided in the lighting system 32 by a plurality of longitudinally spaced light emitting diodes (LEDs) 52. The invention contemplates any number of light sources, and any suitable light source. LEDs 52 are suitable for incremental spacing along the lighting system 32 for illuminating the corresponding adjacent window 24. LEDs 52 require minimal power and output minimal heat in comparison to other light sources such as incandescent or fluorescent.

The LEDs 52 are each oriented beneath a thickness of the flat lens 48 and oriented towards the lens 48 such that light from the LEDs 52 is refracted through the lens 48 to the window 24 and consequently refracted through the panes of the window 24 thereby illuminating the entire window. The LEDs 52 are offset from a leading edge of the opening 44 and are oriented generally parallel with the window 24 to create a suitable indirect illumination effect of the window 24. A gasket 54 is provided between the lighting system cover 50 and the window 24 to seal the lighting cover 50 to the window 24 and prevent light from reflecting from the window 24 and exiting the cover 50 into the interior region 20.

The invention contemplates orienting the LEDs 52 in a direction facing the windows 24. Such orientation results in focused and uneven illumination due the short depth of the housing (34, 38, 40) and the constraints of current LED technology. In order to optimize LED illumination, the LEDs 52 are oriented beneath the lens 48, which acts as a diffuser, collecting the light from the LEDs 52, and redirecting the light to the window 24 resulting in even distributed illumination.

Referring again to FIG. 3, each distal end of the housing (34, 38, 40) is provided with an end cap 56 that is oriented adjacent to the corresponding mullion cover 28. The end caps 56 are provided with ports 58 for receiving fittings 60. The fittings 60 are connected to conduit 62 for conveying wiring 63 within the lighting system 32 for powering the lighting system 32.

As illustrated in FIG. 3, a pair of housings (34, 38, 40) are coterminous at a common mullion cover 28. A junction bracket 64 is provided for attachment to the mullion cover 28. An intermediate cover 66 is provided, which is attached to the junction bracket 64 for concealing the wiring 63 that extends between the end caps 56 of the coterminous housings (34, 38, 40). The intermediate cover 66 has a height corresponding to that of the lighting system covers 50. Likewise, the intermediate cover 66 has a depth such that when abutting the mullion cover 28 the overall depth corresponds to that of the lighting system covers 50 for providing a uniform profile along the windows 24 as illustrated in FIG. 2.

Accordingly, the lighting system 32 is disclosed which may be utilized to retrofit an existing mullion cover and transom cover 28, 30 arrangement for adding a lighting system 32. Alternatively, the base 34 may be formed integrally with the transom cover 30 for installation of the lighting system 32 during the build of the curtain wall 18. Accordingly, the lighting system cover 50 may be sized to extend over the entire base 34 and transom cover 30, extending down to the underlying horizontal structure member 22.

Moreover, the lighting system 32 can be installed into an existing curtain wall 18 by providing a housing, with the base 34, plates 38 and upper flange 40, with a length to fit between a pair of mullion covers 28. The housing (34, 38, 40) is installed upon the horizontal structure member 22 directly, or upon a transom cover 30. A plurality of LEDs 52 are installed within the housing (34, 38, 40), and the cover 50 is installed over the housing (34, 38, 40). Thus, illumination of the windows 24 is provided by a low power lighting system that is concealed providing an ornamental appearance of an existing transom cover.

Although the lighting system 32 is illustrated and described mounted upon the transom covers 30, the invention contemplates that the lighting systems may also be mounted vertically and therefore oriented upon the mullion covers 28. Of course, the invention contemplates utilization of the lighting system 32 at various angles besides horizontal and vertical, and the lighting system 32 can be employed along any window perimeter structure member.

The invention contemplates independent control of lighting system illumination for distinct windows 24. Thus, the illumination can be controlled for conveying messages, images, various color patterns, and the like, externally from the building 10. Such control can be processed with a common controller that conveys signals to each LED 52 through the wiring 63 according to one embodiment. The common controller can be provided by a master controller (not shown) within one of the housings (34, 38, 40) or an external master controller. The master controller controls the LEDs 52 of the corresponding lighting system 32, and can concurrently control a slave controller (not shown) of an adjacent lighting system 32. Therefore, the modularity offered by the hardware of the lighting system 32, can also be employed by the controls for independent or coordinated control as desired for a particular install application. Alternatively, the lighting system 32 may include a receiver for each section of the window 24 for receiving a wireless signal for controlling the illumination effect.

The lighting systems 32 can be controlled for various pixel addressing. For example, each LED 52 may be controlled independently such that each LED 52 is addressed as an individual pixel in an overall illuminated display or message. Two or more, (perhaps all), of the LEDs 52 in a common housing (34, 38, 40) may be addressed as a common pixel. Likewise, LEDs 52 of abutting housings (34, 38, 40) can be addressed as a common pixel. Of course any combination of LEDs 52 may be addressed as a common pixel, ranging from one or more LEDs 52, which may be controlled as desired for the particular display.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A lighting system for a building structure curtain wall having a plurality of perimeter structure members to secure a window, the lighting system comprising:
   a housing sized to be received upon a first perimeter structure member between a pair of sequential perimeter structure members that are each nonparallel with the first perimeter structure member such that the housing extends adjacent to the window, the housing having an opening for facing the window;
   a refracting lens mounted to the housing adjacent to the housing opening; and
   a plurality of longitudinally spaced discrete light sources positioned within the housing, each oriented towards the refracting lens such that light from the plurality of light sources is conveyed to the refracting lens and subsequently out of the housing opening for illuminating the window;
   wherein the housing further comprises:
      a base for supporting the housing upon the perimeter structure member, and
      a cover supported by the base; and
   wherein the cover conceals the refracting lens and the plurality of light sources so that light from the plurality of light sources exits the opening only.

2. The lighting system of claim 1 wherein each of the plurality of light sources is positioned offset from a leading edge of the opening and is oriented generally parallel with the window.

3. The lighting system of claim 1 wherein the refracting lens is generally flat and is displaced along the opening with a thickness direction of the lens facing the window; and
   wherein each of the plurality of light sources is positioned beneath the refracting lens and oriented at a thickness of the refracting lens.

4. The lighting system of claim 1 further comprising a gasket provided along the cover to seal the cover to window and prevent light from reflecting from the window and exiting the cover.

5. The lighting system of claim 1 wherein the housing further comprises an upper flange spaced apart from and supported by the base; and
   wherein the base and the upper flange collectively provide the opening and collectively support the refracting lens.

6. A lighting system for a building structure curtain wall having a plurality of perimeter structure members to secure a window, the lighting system comprising:
  a housing sized to be received upon a first perimeter structure member between a pair of sequential perimeter structure members that are each nonparallel with the first perimeter structure member such that the housing extends adjacent to the window, the housing having an opening for facing the window;
  a refracting lens mounted to the housing adjacent to the housing opening;
  a plurality of longitudinally spaced discrete light sources positioned within the housing, each oriented towards the refracting lens such that light from the plurality of light sources is conveyed to the refracting lens and subsequently out of the housing opening for illuminating the window; and
  a controller oriented in the housing in electrical communication with each of the plurality of discrete light sources for controlling illumination of each of the plurality of discrete light sources, the controller having computer-executable instructions for:
    sending a first output signal for concurrently illuminating the plurality of discrete light sources, and
    sending at least one second output signal for independently illuminating less than all of the plurality of discrete light sources.

7. A lighting system for a building structure curtain wall having a plurality of perimeter structure members to secure a window, the lighting system comprising:
  a housing sized to extend along the window upon a cover of a first perimeter structure member between a pair of sequential perimeter structure members that are each nonparallel with the first perimeter structure member, the housing having an opening for facing the window;
  a light source positioned within the housing such that light from the light source is conveyed out of the housing opening for illuminating the window; and
  a lighting system cover supported by the housing for concealing the light source and providing an ornamental appearance similar to that of the cover of the underlying first perimeter structure member without obfuscating an ornamental appearance of the window and the perimeter structure members.

8. The lighting system of claim 7 wherein the lighting system cover has a depth in a direction normal to the window, the depth being sized to match that of the cover of the underlying first perimeter structure member.

9. The lighting system of claim 7 wherein the lighting system cover is adapted to cooperate with the housing so that light from the light source exits the housing opening only.

10. The lighting system of claim 7 wherein the housing further comprises:
  a base for supporting the housing upon the cover of the underlying first perimeter structure member; and
  an upper flange spaced apart from and supported by the base;
  wherein the base and the upper flange collectively provide the opening.

11. The lighting system of claim 10 wherein the housing further comprises at least one web extending from the base for supporting the flange spaced apart from the base.

12. The lighting system of claim 7 wherein the housing further comprises a pair of end caps each mounted to a distal end of the base adjacent to one of the pair of structure members for enclosing the housing.

13. The lighting system of claim 12 wherein at least one of the pair of end caps is provided with at least one port for providing wiring to the light source.

14. The lighting system of claim 13 further comprising at least one fitting connected to the at least one port.

15. The lighting system of claim 14 further comprising conduit mounted to the at least one fitting for conveying the wiring within the housing.

16. The lighting system of claim 7 wherein the housing is further defined as a first housing, the light source is further defined as a first light source, and the lighting system cover is further defined as a first lighting system cover; and
  wherein the lighting system further comprises:
    a second housing sized to be received upon the cover of the first perimeter structure member between a second pair of sequential perimeter structure members that are each nonparallel with the first perimeter structure member such that the second housing extends adjacent to the window and the first and second housings are coterminous at one of the sequential perimeter structure members, further defined as a common perimeter structure member, and the second housing extends adjacent to the window, the second housing having an opening for facing the window,
    a second light source positioned within the second housing such that light from the second light source is conveyed out of the opening of the second housing for illuminating the window, and
    a second lighting system cover supported by the second housing for concealing the second light source and providing an ornamental appearance similar to that of the cover of the underlying first perimeter structure member without obfuscating an ornamental appearance of the window and the perimeter structure members.

17. The lighting system of claim 16 further comprising:
  wiring for powering the first and second light sources, the wiring extending through the coterminous ends of the first and second housings; and
  an intermediate cover mounted to the common perimeter structure member between the pair of coterminous ends of the first and second housings for concealing the wiring.

18. The lighting system of claim 17 further comprising:
  a first controller oriented in the first housing in electrical communication with the first light source for controlling illumination of the first light source; and
  a second controller oriented in the second housing in electrical communication with the second light source for controlling illumination of the second light source;
  wherein the first controller is in electrical communication with one of the second controller and an external controller via the wiring extending through the ends of the first and second housings, and the second controller is in electrical communication with one of the first controller and the external controller via the wiring extending through the ends of the first and second housings.

19. The lighting system of claim 17 wherein the intermediate cover has a depth in a direction normal to the window and a height in a direction parallel with the window, the depth and height being sized to match that of the first and second lighting system covers for providing a uniform profile along the window.

20. The lighting system of claim 17 further comprising a bracket mounted to the common perimeter structure member between the pair of coterminous ends of the first and second housings for supporting the intermediate cover.

21. A lighting system for a building structure curtain wall having a plurality of perimeter structure members to secure a window, the lighting system comprising:
- a housing sized to extend along the window upon a first perimeter structure member between a pair of sequential perimeter structure members that are each nonparallel with the first perimeter structure member, the housing having an opening for facing the window;
- a light source positioned within the housing such that light from the light source is conveyed out of the housing opening for illuminating the window; and
- a cover supported by the housing for concealing the light source and the first perimeter structure member of the curtain wall without obfuscating an ornamental appearance of the window and the perimeter structure members.

22. A method for installing a lighting system to a building structure curtain wall having a plurality of perimeter structure members to secure a window, the method comprising:
- providing a housing that is sized to extend between a pair of sequential perimeter structure members adjacent the window with an opening in the housing;
- installing the housing upon a perimeter structure member that is adjacent to and nonparallel with the pair of sequential perimeter structure members;
- installing a light source within the housing such that light from the light source is conveyed out of the housing opening for illuminating the window;
- providing a lighting system cover that is sized and shaped to provide the appearance of one of a transom cover and a mullion cover; and
- installing the lighting system cover over the housing such that the lighting system cover conceals the light source without obfuscating an ornamental appearance of the window and the perimeter structure members.

23. The method for installing a lighting system of claim 22 further comprising installing the housing directly upon the perimeter structure member.

24. The method for installing a lighting system of claim 22 further comprising installing the housing directly upon a transom.

25. A lighting system for a building structure curtain wall having a plurality of perimeter structure members to secure a window, the lighting system comprising:
- a housing sized to be received upon a first perimeter structure member between a pair of sequential perimeter structure members that are each nonparallel with the first perimeter structure member such that the housing extends adjacent to the window, the housing having an opening for facing the window; and
- a plurality of longitudinally spaced discrete light sources positioned within the housing, each oriented towards the housing opening for illuminating the window;
- wherein the housing further comprises:
  - a base for supporting the housing upon the perimeter structure member, and
  - a cover supported by the base; and
- wherein the cover conceals the refracting lens and the plurality of light sources so that light from the plurality of light sources exits the opening only.

26. A lighting system for a building structure curtain wall having a plurality of perimeter structure members to secure a window, the lighting system comprising:
- a housing sized to be received upon a first perimeter structure member between a pair of sequential perimeter structure members that are each nonparallel with the first perimeter structure member such that the housing extends adjacent to the window, the housing having an opening for facing the window;
- a plurality of longitudinally spaced discrete light sources positioned within the housing, each oriented towards the housing opening for illuminating the window; and
- a controller oriented in the housing in electrical communication with each of the plurality of discrete light sources for controlling illumination of each of the plurality of discrete light sources, the controller having computer-executable instructions for:
  - sending a first output signal for concurrently illuminating the plurality of discrete light sources, and
  - sending at least one second output signal for independently illuminating less than all of the plurality of discrete light sources.

* * * * *